United States Patent [19]
Nishiyama

[11] Patent Number: 5,511,240
[45] Date of Patent: Apr. 23, 1996

[54] RADIO TELEPHONE SYSTEM CAPABLE OF TRANSMITTING DATA COMMUNICATION THROUGH A BATTERY CHARGER

[75] Inventor: Kohei Nishiyama, Tokyo, Japan

[73] Assignee: NEC Corporation, Tokyo, Japan

[21] Appl. No.: 971,592

[22] Filed: Nov. 5, 1992

[30] Foreign Application Priority Data

Nov. 5, 1991 [JP] Japan ..................................... 3-315207

[51] Int. Cl.[6] ..................................................... H04B 3/54
[52] U.S. Cl. .............................. 455/127; 455/88; 455/89; 455/343; 379/61
[58] Field of Search .................................. 455/88, 89, 90, 455/127, 185.1, 186.1, 186.2, 186.3, 343, 346, 351, 349, 348; 379/58, 59, 61; 323/208; 363/39; 340/310.01

[56] References Cited

U.S. PATENT DOCUMENTS

| | | | |
|---|---|---|---|
| 4,593,155 | 6/1986 | Hawkins | 455/89 |
| 4,700,375 | 10/1987 | Reed | 379/61 |
| 4,771,399 | 9/1988 | Snowden et al. | 455/186 |
| 4,894,856 | 1/1990 | Nakanishi et al. | 379/61 |
| 5,212,811 | 5/1993 | Kuge et al. | 455/89 |

*Primary Examiner*—Chi H. Pham
*Attorney, Agent, or Firm*—Sughrue, Mion, Zinn, Macpeak & Seas

[57] ABSTRACT

A portable radio telephone system includes a small and light radio telephone device and a charger for charging a storage battery in the radio telephone device. The charger has a connector for connection to a data communication device. A data signal received by a radio circuit and converted by a baseband circuit in the radio telephone device is supplied to a data interface, which superpose the data signal on charging electric energy. The data signal is then supplied through charging terminals of the radio telephone device and charging terminals of the charger. In the charger, the data signal is converted by a data interface into a signal for transmission through the connector to the data communication device.

8 Claims, 6 Drawing Sheets

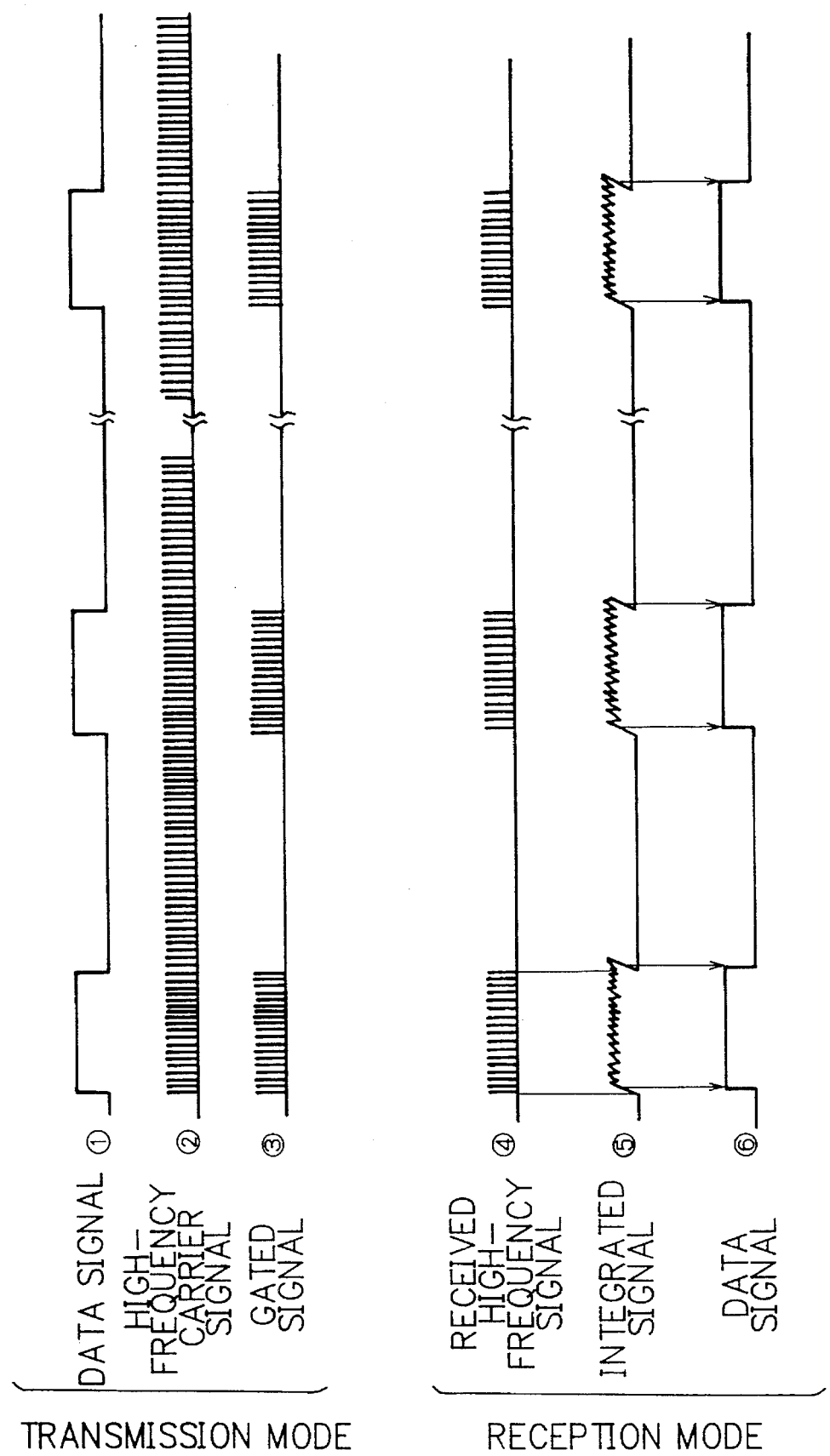

RADIO TELEPHONE SYSTEM CAPABLE OF TRANSMITTING DATA COMMUNICATION THROUGH A BATTERY CHARGER

BACKGROUND OF THE INVENTION

The present invention relates to a radio telephone system capable of data communication through a radio circuit, and more particularly to a radio telephone device having an interface with a data communication device, and a radio telephone system having a charger for charging a storage battery in such a radio telephone device. Description of the Related Arts As well known in the art, radio telephone systems can be used anywhere for radio communications in areas where radio waves can be propagated, i.e., can be received by the radio telephone systems. Stated otherwise, the users of radio telephone systems can receive the benefit of telephone service anywhere insofar as radio waves can be propagated at levels high enough for radio transmission and reception irrespective of whether they are on land, at sea, or aerial.

Primary telephone service and voice/data exchange service are generally provided by way of wire telecommunication. Naturally, wire telephone service cannot be provided unless various pieces of equipment necessary for wire telecommunication, including switching exchanges, repeater exchanges, and transmission lines to subscribers, are complete. Since installation and maintenance of the necessary equipment are highly expensive, providing wire telephone service in areas where user needs are low is not cost-effective. In addition, certain geographical limitations, which may be posed by mountains, deserts, or the like, prevent necessary equipment for wire telecommunication service from being installed even if there are demands for telephone service.

Those areas which are not cost-effective for wire telephone service and which suffer from geographical limitations may be provided with telephone service by a radio telephone system. The radio telephone system can give users as good telephone service as the wire telephone system, is much less costly than the wire telephone system, and is hence highly cost-effective. Specifically, it is possible in the radio telephone system to effectively utilize frequencies and efficiently operate radio base stations by designing radio zones and selecting zone radii and transmission power settings according to the number of users of the radio telephone system and the area to be provided with the radio telephone service.

In the radio telephone system, it is sometimes desired that a data communication device be connected to a radio telephone device to carry out data communication between the radio telephone device and another data communication device through a radio circuit. Heretofore, it has been customary to provide the radio telephone device with a connector for connection to the data communication device. The connector has a physical size which may vary depending on the data interface of the data communication device to be coupled to the connector. Because of the conventional connector design, the radio telephone device, which should be portable by nature, cannot be greatly reduced in size and weight.

SUMMARY OF THE INVENTION

It is therefore an object of the present invention to provide a radio telephone system capable of data communication which is portable to achieve a small and light radio telephone device.

According to the present invention, there is provided a radio telephone system comprising a radio telephone device for transmitting and receiving a data signal and charging means for supplying charging electric energy to the radio telephone device. The radio telephone device comprises first power supply means for supplying electric energy, a first data interface connected to the first power supply means for converting the data signal, control means connected to the first data interface for controlling the data interface, a radio circuit for transmitting and receiving the data signal, a baseband circuit for converting the data signal into a baseband signal, and first charging terminal means connected to the first power supply means and the first data interface. The charging means, which supplies charging electric energy to the first power supply means, comprises second power supply means for supplying charging electric energy to the first power supply means, second data interface connected to the second power supply means for converting a data signal, a connector connected to the data interface for connection to a data communication device, and second charging terminal means connected to the second power supply means and the second data interface for transmitting the charging electric energy from the second power supply means through the first charging terminal means to the first power supply means.

The radio telephone device also includes a first impedance circuit for giving the first power supply means a sufficiently high impedance with respect to frequencies higher than a predetermined frequency, and the charging means also includes a second impedance circuit for giving the second power supply means a sufficiently high impedance with respect to frequencies higher than a predetermined frequency.

The radio telephone device further includes key inputting means connected to the control means for applying command signals to the control means.

According to the present invention, there is also provided a radio communication method comprising the steps of transmitting and receiving a data signal by a radio telephone device and supplying charging electric energy to a first power supply means by a charging means. The step of transmitting and receiving a data signal by a radio telephone device includes the steps of supplying electric energy by first power supply means, converting the data signal by a first data interface connected to the first power supply means, transmitting and receiving the data signal by a radio circuit, converting the data signal into a baseband signal by a baseband circuit and charging to the first power supply means and the first data interface. The supplying charging electric energy to the first power supply means by the charging means includes the steps of supplying charging electric energy to the first power supply means by second power supply means, converting a data signal by second data interface connected to the second power supply means, transmitting the charging electric energy from the second power supply means to the first power supply means through the first charging terminal means by second charging terminal means connected to the second power supply means and the second data interface.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 8 is a timing chart of signals that are received by and transmitted from the radio telephone system.

DESCRIPTION OF THE PREFERRED EMBODIMENTS

For a better understanding of the present invention, a conventional radio telephone system will first be described below with reference to FIGS. 1 and 2.

Figure 1:
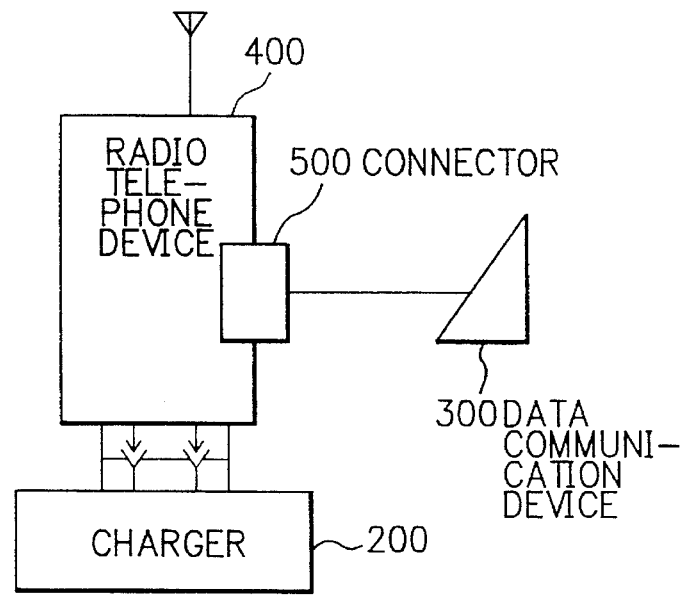
FIG. 1 is a block diagram of a conventional radio telephone system.

As shown in FIG. 1, the conventional radio telephone system comprises a radio telephone device 400 and a charger 200 for charging a storage battery in the radio telephone device 400. The radio telephone device 400 has a connector 500 for connection to a data communication device 300 to carry out data communication with another data communication device through a radio circuit.

Figure 2:
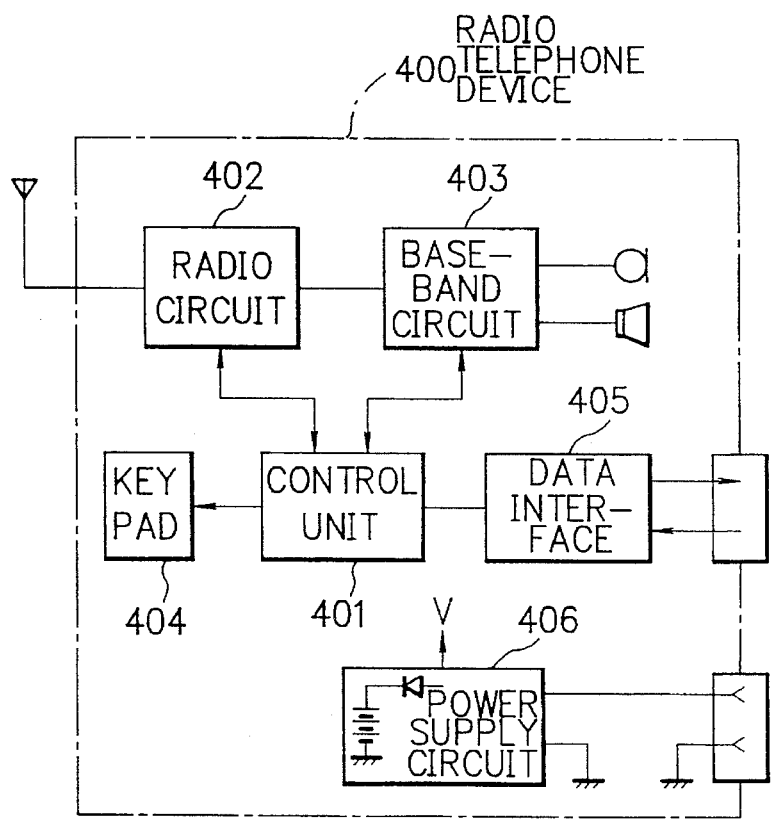
FIG. 2 is a block diagram of a radio telephone device in the conventional radio telephone system shown in FIG. 1.

As shown in FIG. 2, the radio telephone device 400 has a control unit 401 for controlling various circuits in the radio telephone device 400, which include a radio circuit 402, a baseband circuit 403, a key pad 404, a data interface 405, and a power supply circuit 406. The radio circuit 402, which is connected to the control unit 401, transmits and receives radio waves. The baseband circuit 403 is connected to the control unit 401 and the radio circuit 402, and transmits control command data to and receives control command data from the radio circuit 402 for controlling operation of the radio telephone device. The baseband circuit 408 includes communication/control circuits for a microphone and a speaker for transmitting and receiving radio data. The key pad 404 is connected to the control unit 401 for interfacing the operator of the radio telephone device 400. The data interface 405 is also connected to the control unit 401 for transmitting data to and receiving data from a data communication device 300. The power supply circuit 406 serves to charge a storage battery in the radio telephone device 400, receive charging electric energy from the charger 200, and also supply electric energy to the various circuits in the radio telephone device 400. The power supply circuit 406 is connected to charging terminals.

To connect the data communication device 300 to the radio telephone device 400 for effecting data communication between the radio telephone device 400 and another data communication device through a radio circuit, the radio telephone device 400 has a connector 500 for connection to the data communication device 300. The connector 500 has a physical size which may vary depending on the data interface of the data communication device 300 to be coupled to the connector 500. Because of the conventional connector design, the radio telephone device 400, which should be portable by nature, cannot be greatly reduced in size and weight.

Figure 3:
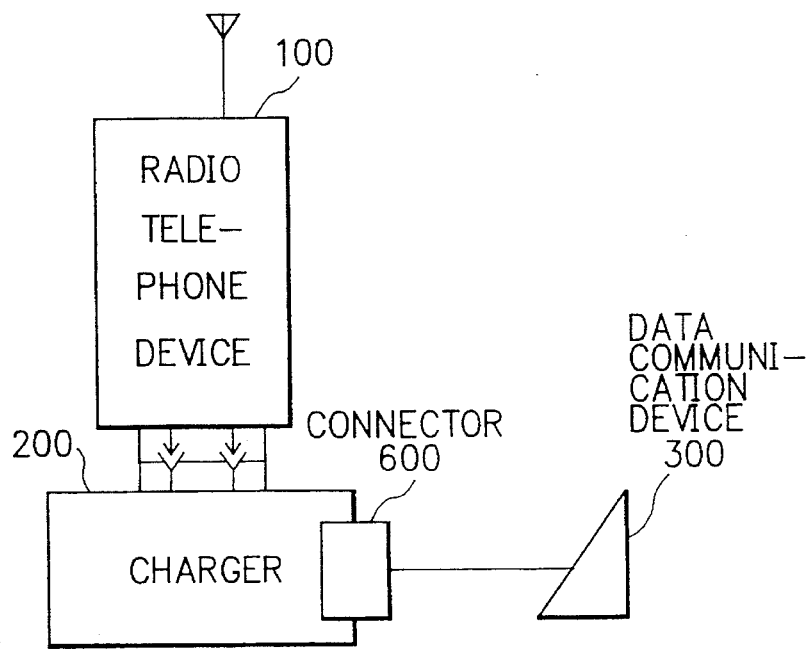
FIG. 3 is a block diagram of a radio telephone system according to the present invention.

FIG. 3 shows in block form a radio telephone system according to the present invention.

As shown in FIG. 3, the radio telephone system comprises a radio telephone device 100 and a charger 200 for charging a storage battery in the radio telephone device 100. The charger 200 has a connector 600 for connection to a data communication device 300 to carry out data communication with another data communication device through a radio circuit.

Figure 4:
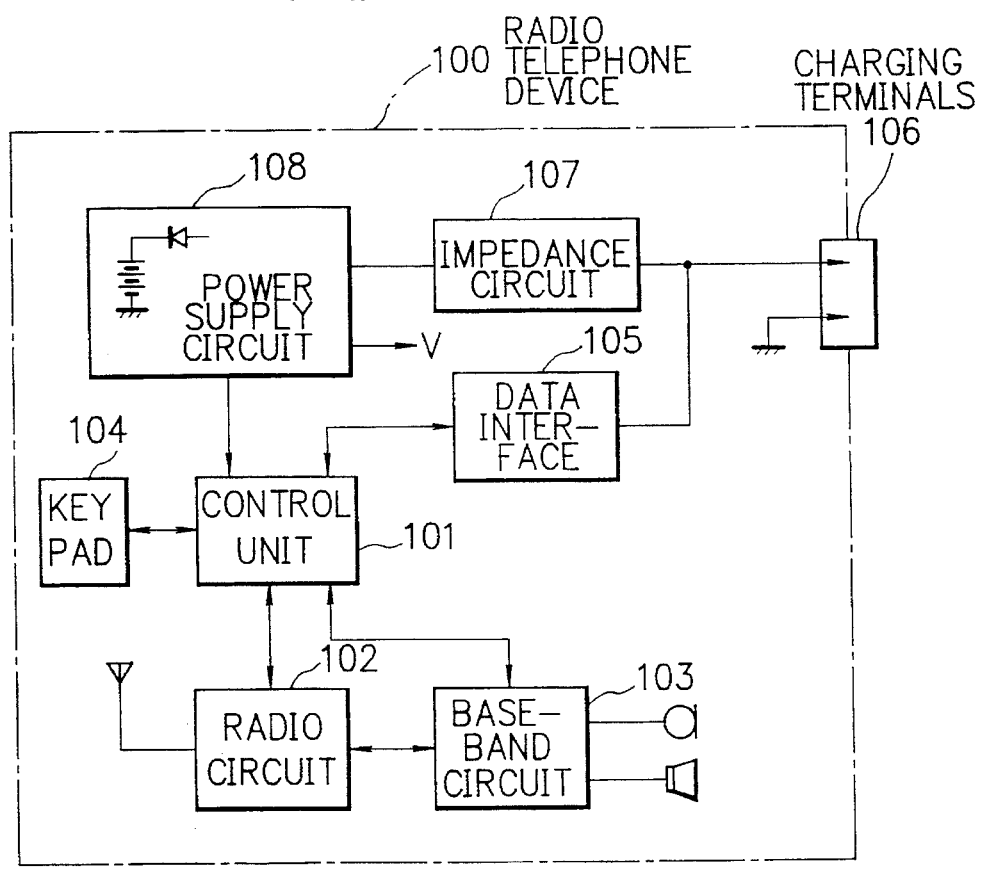
FIG. 4 is a block diagram of a radio telephone device in the radio telephone system shown in FIG. 3.

The radio telephone device 100 is shown in detailed in FIG. 4. The charger 200 is shown in detail in FIG. 5.

As shown in FIG. 4, the radio telephone device 100 has a control unit 101 for controlling various circuits in the radio telephone device 100. The radio telephone device 100 also includes a radio circuit 102 for transmitting and receiving radio waves under the control of the control unit 101, and a baseband circuit 103 connected to the control unit 101 and the radio circuit 102 for transmitting control command data to and receiving control command data from the radio circuit 102 for controlling operation of the radio telephone device 100, the baseband circuit 103 including communication/control circuits for a microphone and a speaker for transmitting and receiving radio data. The radio telephone device 100 further includes a key pad 104 connected to the control unit 401 for interfacing the operator of the radio telephone device 100, a data interface 105 connected to the control unit 101 for interfacing, through the control unit 101, communication data which is transmitted and received through the radio circuit 102 and the baseband circuit 103, a power supply circuit 108 including a charging circuit for charging a storage battery in the radio telephone device 100, an impedance circuit 107 connected to the power supply circuit 108 and the data interface 105 for providing a sufficiently high impedance with respect to the impedance of the power supply circuit 108 at a carrier signal frequency for communication data, and charging terminals 106 connected to the impedance circuit 107 and the data interface 105 for transmitting charging electric energy and communication data in a superposed fashion.

Figure 5:
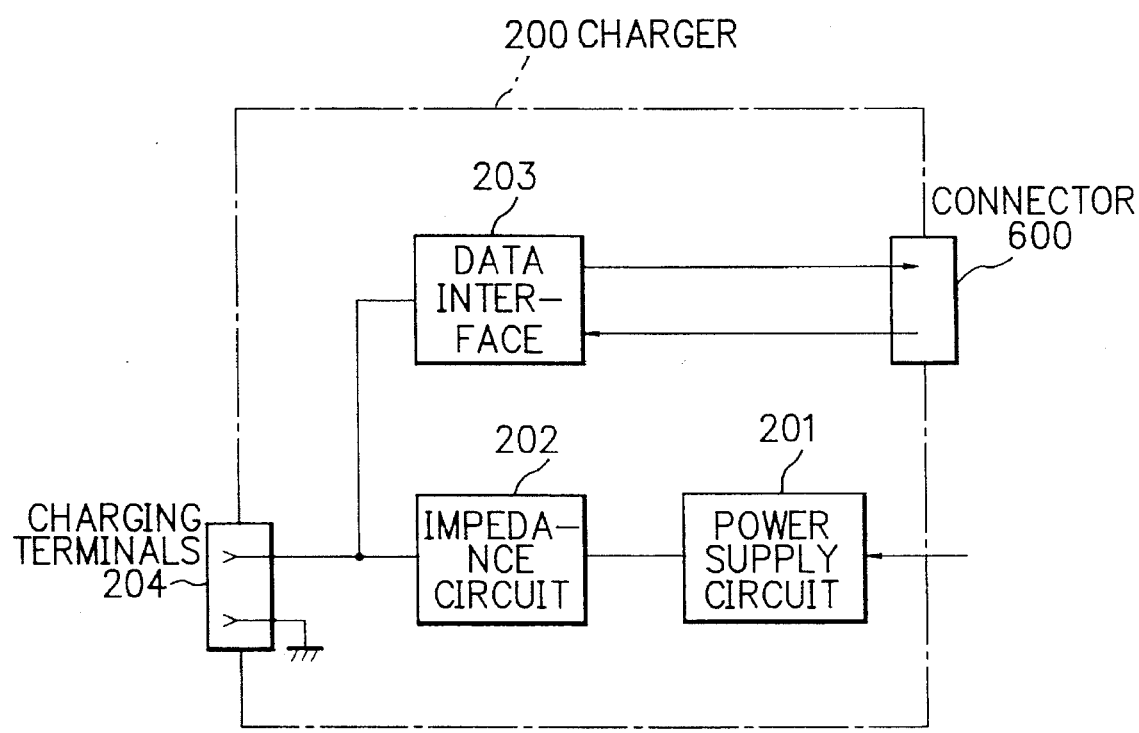
FIG. 5 is a block diagram of a charger in the radio telephone system shown in FIG. 3.

As shown in FIG. 5, the charger 200 comprises a power supply circuit 201, an impedance circuit 202 connected to the power supply circuit 201 for providing a sufficiently high impedance with respect to the impedance of the power supply circuit 201, a data interface 203 connected to the impedance circuit 202, and charging terminals 204 connected to the impedance circuit 202 and the data interface 203 for transmitting charging electric energy and communication data in a superposed fashion. The connector 600 is connected to the data interface 203 for connection to the data communication device 300.

The radio telephone device 100 and the charger 200 can be connected to each other through the charging terminals 106, 204.

Figure 6:
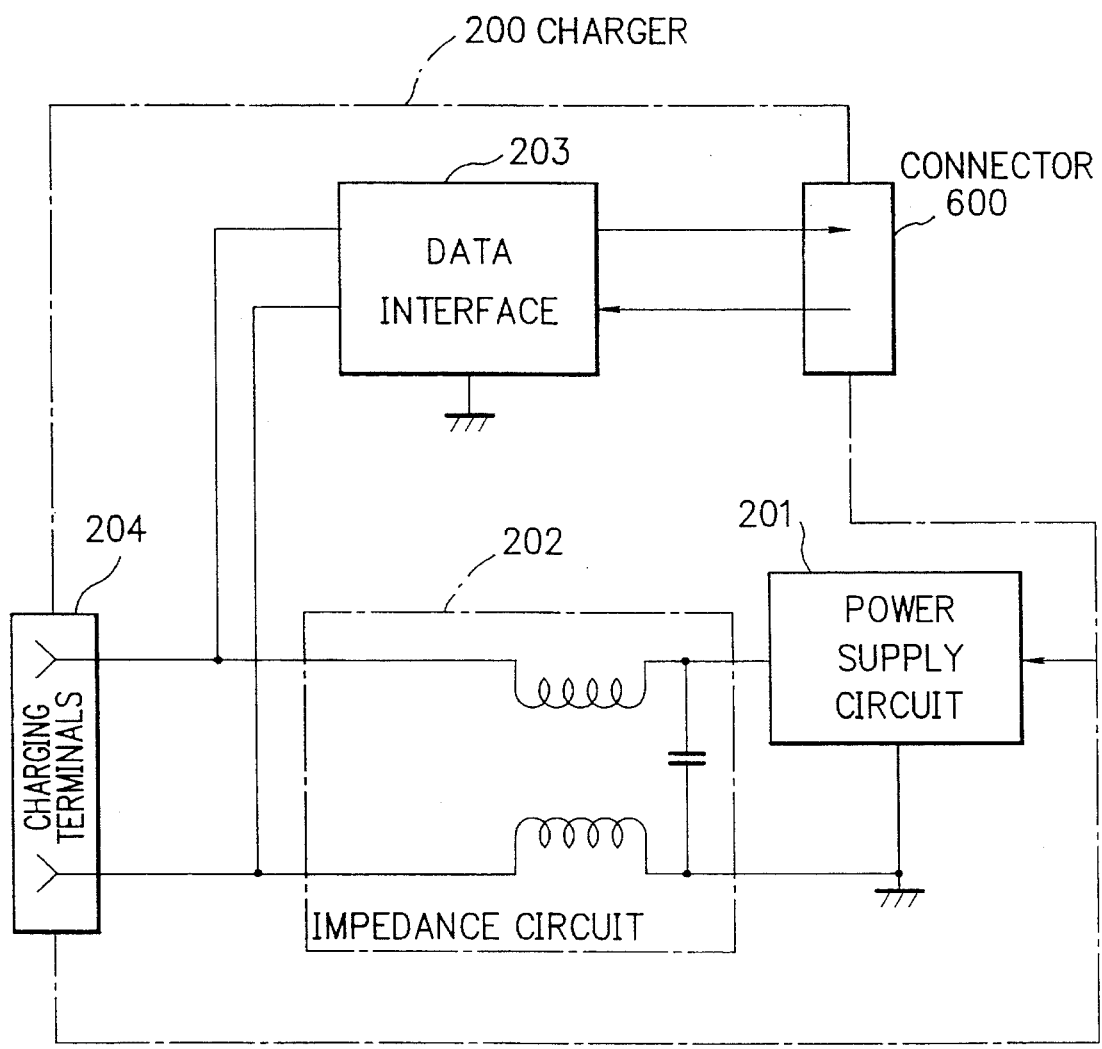
FIG. 6 is a block diagram similar to FIG. 5, showing in detail a circuit arrangement of an impedance circuit in the charger shown in FIG. 5.

Each of the impedance circuits 107, 202 comprises inductive elements and a capacitive element as shown in FIG. 6.

Because charging electric energy and communication data are transmitted in a superposed fashion through the charging terminals 106, 204, the impedance circuits 107, 202 serve to give the power supply circuits 108, 201, respectively, a sufficiently high impedance with respect to the communication data transmitted through the charging terminals 106, 204. Therefore, as shown in FIG. 6, the impedance circuit 202 is connected in series to the power supply circuit 201 so that the impedance of the charger 200 as viewed from the radio telephone device 100 is sufficiently high.

The data interfaces 105, 203 serve to convert communication data transmitted to and received from the data communication device 300 that is connected to the charger 200.

Figure 7:
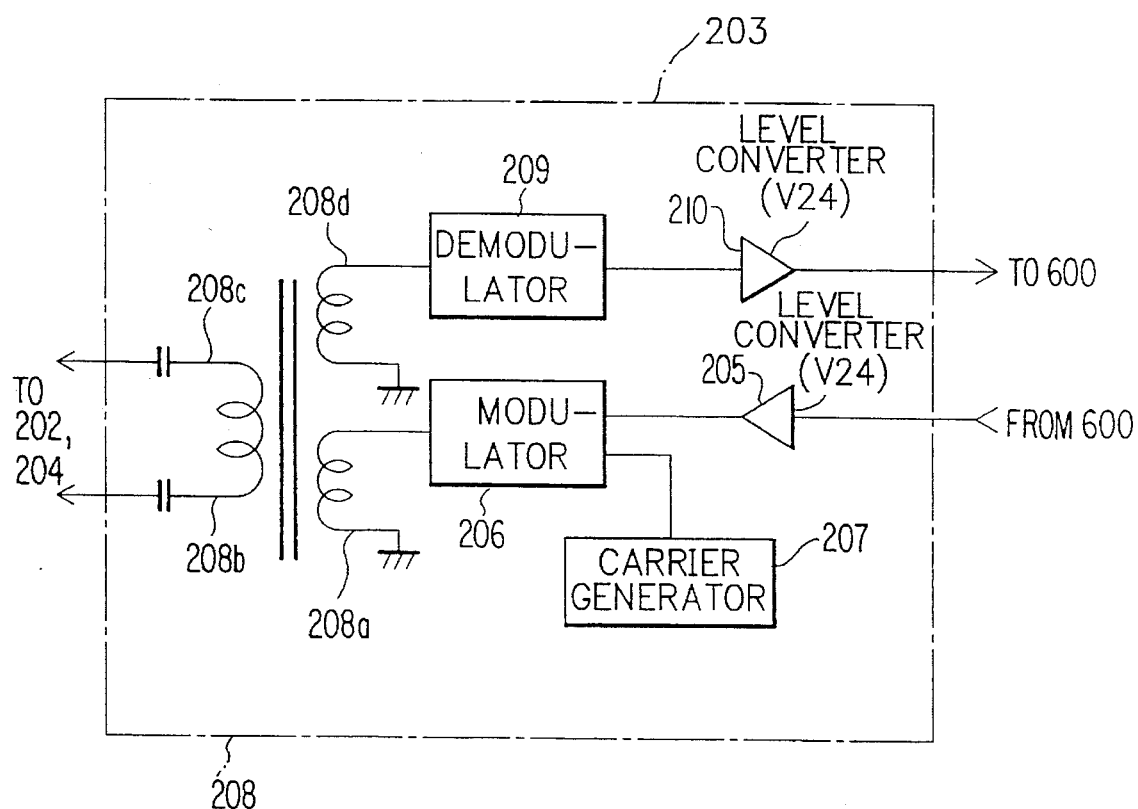
FIG. 7 is a block diagram of a circuit arrangement of each of data interfaces shown in FIGS. 4 and 5.

Specifically, the data interfaces 105, 203 convert an analog interface signal from an interface V24 of a personal computer, an interface V35 or X21 of an office computer, or the like into a TTL- or CMOS-level digital signal and vise versa, before using the converted signal to modulate a high frequency carrier into an analog signal to be transmitted through a pulse transformer at either end of the charging terminals 204, where the signal is superimposed on a charging current, and after demodulating the modulated analog signal, as it is transmitted via the charging terminals 204 and separated from the carrier through another pulse transformer at the other end of the terminals 204, as shown in the example of FIG. 7.

FIG. 7 shows a circuit arrangement of each of the data interfaces 105, 203 by way of example. In FIG. 7, the data interfaces 105, 208 convert an interface signal from the interface V24. In order to illustrate the operation of such a circuit, the elements shown in FIG. 7 include a V24-level converter 205 connected at an input terminal thereof to the connector 600 and at an output terminal thereof to an input terminal of a modulator 206. The other input terminal of modulator 206 is connected to a carrier generator 207. The output terminal of modulator 206 is connected to a primary winding 208a of a pulse transformer 208, of which a secondary winding 208b is connected through capacitors 208c to the impedance circuit 202 and the charging terminals 204. A demodulator 209 is connected at the input end thereof to a tertiary winding 208d, and another V24-level converter 210 is connected at the input end thereof to the output end of the Operation of each of the data interfaces 105, 203 for transmitting and receiving a data signal will be described below with reference to FIG. 8. When it operates in a transmission mode, it can produce a gated signal (see ③ in FIG. 8) from a gate which is supplied with a data signal to be transmitted (see ① in FIG. 8) and a high-frequency carrier signal (see ② in FIG. 8). In each of the data interfaces 105, 203, the produced signal drives a pulse transformer or the like for thereby superposing the data signal on charging electric energy for transmission to the charging terminals. In a reception mode, a received high-frequency signal (see ④ in FIG. 8) is integrated into a signal (see ⑤ in FIG. 8) by an integrator, and an original data signal (see ⑥ in FIG. 8) is demodulated from the integrated signal.

The radio telephone device 100 and the charger 200 may be connected to each other by any of various known means including a modem.

The data communication device 300 which is connected to the radio telephone system effects data communication with another data communication device that is connected to the data communication device 800 through a radio circuit, as follows:

It is assumed that the radio telephone system has already been connected to a radio communication link and operating in a certain radio channel.

A data signal received from the radio circuit is supplied through the radio circuit 102 to the baseband circuit 103, which generates a baseband signal. The data interface 105 operates in the manner described above to superpose the data signal on charging electric energy. The superposed data signal is then applied to the charging terminals 106. The data signal is transmitted from the charging terminals 106 to the charging terminals 204 of the charger 200, from which the data signal is supplied to the data interface 203. The data interface 203 operates in the manner described above to convert the supplied data signal into a data signal for transmission to the data communication device 300. The converted data signal is then supplied from the data interface 203 through the connector 600 to the data communication device 300.

In this manner, the data signal received by the radio telephone device 100 is transferred through the charger 200 to the data communication device 300 for data communication with another data communication device linked with the radio telephone device 100.

According to the present invention, as described above, the charger 200 has the connector 600 to be connected to the data communication device 300 for data communication between the data communication device 300 and another data communication device through a radio circuit. Therefore, irrespective of the physical size of the connector 600, the radio telephone device 100 itself may be small in size and weight, making it possible to render the radio telephone system portable.

The radio telephone system according to the present invention is effective to give users public telephone service, especially, telephone service and data communication service, in those geographical regions, e.g., mountain and desert regions, which suffer certain limitations that prevent various pieces of wire telephone equipment, including switching exchanges, repeater exchanges, and transmission lines to subscribers, from being installed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A radio telephone system comprising:

a radio telephone device for transmitting and receiving an audio communication signal and a data communication signal, said radio telephone device comprising:

a radio circuit for transmission and reception of said audio communication and data communication signals;

a baseband circuit for conversion between said audio communication signal and a baseband signal, and between said data communication signal and a baseband signal;

a first data interface for conversion between one of said baseband signals, corresponding to said data communication signal, and an analog signal;

a controller for controlling said radio circuit, said base band circuit and said first data interface;

a first power supplier for energizing said radio telephone device;

a first charging terminal connected to said first power supplier and said first data interface;

a charger for supplying charging power to said first power supplier, said charger comprising:

a second power supplier for supplying said charging power of said first power supplier;

a second data interface for conversion between said analog signal and said data communication signal;

a connector for interconnection between said second data interface and a data communication device responsive to said data communication signal;

a second charging terminal connected to said second power supplier and said second data interface;

said second charging terminal being connectable with said first charging terminal for transmitting said charging power and said analog signal.

2. A radio telephone system as claimed in claim 1, wherein said radio telephone device further comprises a first impedance circuit for providing said first power supplier a sufficiently high impedance with respect to frequencies higher than a first predetermined frequency, and said charger further comprises a second impedance circuit for providing said second power supplier a sufficiently high impedance with respect to frequencies higher than a second predetermined frequency.

3. A radio telephone system as claimed in claim 1, wherein said radio telephone device further comprises an input interface connected to said controller for applying command signals to said controller.

4. A radio telephone system as claimed in claim 1, wherein said charger further comprises a pulse transformer for superimposing said analog signal onto said charging power.

5. A radio communication method enabling data transmission between a data communication device and a radio telephone through a power charger of the radio telephone, comprising the steps of:

provrding said radio telephone and said power charger with first and second data interfaces., respectively;

receiving a data signal by said radio telephone, said radio telephone responsive to said data signal to select a data communication channel;

converting the data signal into a baseband signal by a baseband circuit;

converting the baseband signal into an analog signal by said first data interface;

connecting said charger to said first data interface;

superimposing said analog signal onto a charging current flowing between said second data interface of the charger and said first data interface;

separating said analog signal from said charging current;

converting said analog signal into a data signal by said second data interface connected to said second power supplier;

transmitting the data signal from said charger to said data communication device.

6. A method for transmitting data communication signal between a radio telephone and a data communication device connected to the radio telephone through a power charger of the radio telephone, comprising the steps of:

providing said radio telephone and said power charger with first and second data interfaces, respectively, each of said first and second data interfaces selectively converting between said data communication signal and an analog signal, and between said analog signal and said data communication signal;

performing data communication by transmitting said analog signal between said first and second data interfaces by superimposing said analog signal onto a power transmission between said power charger and said radio telephone to thereby effect data communication with said data communication device over said radio telephone.

7. The method of claim 5 wherein the steps of performing data communication further comprise:

transmitting said data communication signal from said data communication device to said second interface of said power charger;

converting said data communication signal into said analog signal by said second data interface;

superimposing said analog signal onto said power transmission between said power charger and said radio telephone;

receiving said analog signal by said first data interface and converting said analog signal into said data communication signal.

8. The method of claim 6 further comprising a step of receiving said data communication signal by the data communication device through the radio telephone by the steps comprising:

receiving said data communication signal by said radio telephone;

converting said data communication signal into said analog signal by said first data interface;

superimposing said analog signal onto said power transmission between said power charger and said radio telephone;

receiving said analog signal by said second data interface and converting said analog signal into said data communication signal.

\* \* \* \* \*

UNITED STATES PATENT AND TRADEMARK OFFICE
CERTIFICATE OF CORRECTION

PATENT NO.  : 5,511,240
DATED       : April 23, 1996
INVENTOR(S) : Kohei NISHIYAMA It is certified that error(s) appears in the above-identified patent and that said Letters Patent is hereby corrected as shown below:

Column 3, line 40, delete "408" and insert --403--.

Column 5, line 30, after "the" insert --demodulator 209 and at an output terminal thereof to the connector 600-.

Column 5, line 52, delete "800" and insert --300--.

Signed and Sealed this

Thirtieth Day of July, 1996

Attest:

BRUCE LEHMAN

*Attesting Officer*         *Commissioner of Patents and Trademarks*